United States Patent
Walters et al.

(10) Patent No.: US 12,007,831 B2
(45) Date of Patent: Jun. 11, 2024

(54) DEVICES AND COMPONENTS FOR MACHINE LEARNING-BASED SIGNAL ERROR CORRECTION AND METHODS OF USE THEREOF

(71) Applicant: Capital One Services, LLC, McLean, VA (US)

(72) Inventors: Austin Walters, Savoy, IL (US); Jeremy Goodsitt, Champaign, IL (US); Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 136 days.

(21) Appl. No.: 17/405,877

(22) Filed: Aug. 18, 2021

(65) Prior Publication Data
US 2023/0059190 A1   Feb. 23, 2023

(51) Int. Cl.
| G06F 11/00 | (2006.01) |
| G06F 11/07 | (2006.01) |
| G06N 3/04 | (2023.01) |
| G06N 20/00 | (2019.01) |

(52) U.S. Cl.
CPC ...... *G06F 11/0793* (2013.01); *G06F 11/0721* (2013.01); *G06F 11/0751* (2013.01); *G06N 3/04* (2013.01); *G06N 20/00* (2019.01)

(58) Field of Classification Search
CPC ............. G06F 11/0793; G06F 11/0721; G06F 11/0751; G06F 11/3089
See application file for complete search history.

(56) References Cited

U.S. PATENT DOCUMENTS

| 10,592,821 B2 | 3/2020 | Denton et al. | |
| 10,685,159 B2 | 6/2020 | Su et al. | |
| 2019/0042945 A1* | 2/2019 | Majumdar | G06N 3/045 |
| 2019/0050515 A1* | 2/2019 | Su | G06N 3/045 |
| 2021/0157991 A1* | 5/2021 | Wang | G06N 3/047 |

* cited by examiner

*Primary Examiner* — Katherine Lin
(74) *Attorney, Agent, or Firm* — Greenberg Traurig, LLP

(57) ABSTRACT

The present disclosure enables signal error correction using a first processor and a memory on a first substrate, where the first processor is operationally connected to a second processor on a second substrate and the memory stores computer code having a machine learning model. The first processor executes computer code to: automatically receive from the second processor, a first output signal intended to be received by a target recipient device. The first processor automatically inputs the first output signal into the machine learning model, where the machine learning model determines that the first output signal includes an error signal that would cause a malfunction in the target recipient device, and output an instruction to cause the first processor to generate a second output signal that corrects the error signal. The first processor automatically generates the second output signal and transmits the second output signal to the target recipient device.

18 Claims, 11 Drawing Sheets

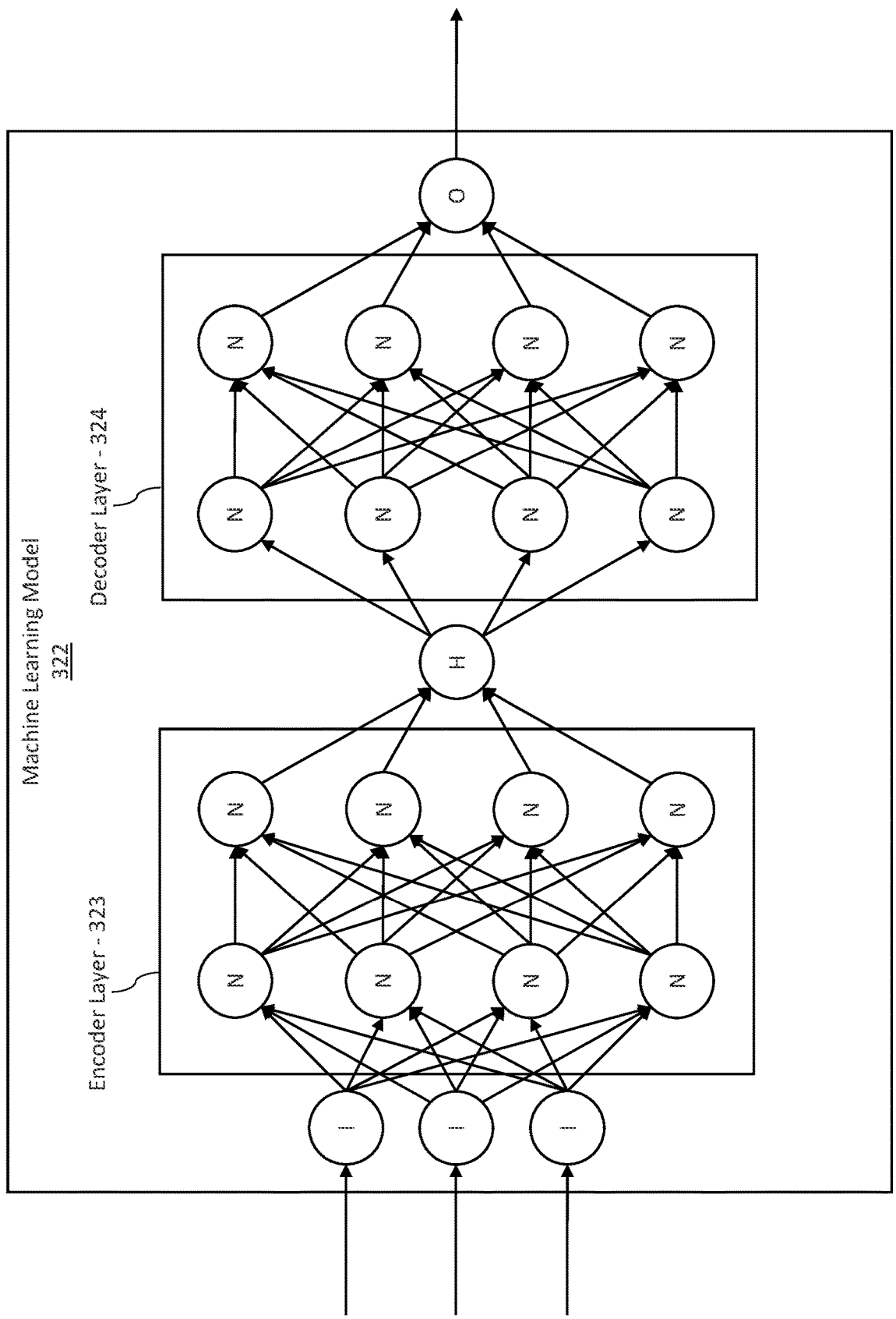

DEVICES AND COMPONENTS FOR MACHINE LEARNING-BASED SIGNAL ERROR CORRECTION AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Service, LLC, All Rights Reserved.

FIELD OF TECHNOLOGY

The present disclosure generally relates to computer-based systems, devices and/or components configured for machine learning-based error correction for signals and methods of use thereof, including control signal error detection and correction using automated machine learning processes.

BACKGROUND OF TECHNOLOGY

Various devices emit signals that carry information to other devices to communicate information, control the recipient devices, provide input to computing devices, or otherwise communicate signal data. However, the processing devices, such as microcontrollers, embedded processors and circuit arrays, or other embedded or non-embedded processing devices, may be subject to errors in the generation of the signals. For example, temperature or humidity may affect the processing devices and influence creation of the signal, resulting signal error. Yet, in many circumstances, the presence of the error or the correct signal is not easily detected, and thus often goes uncorrected.

SUMMARY OF DESCRIBED SUBJECT MATTER

In some embodiments, the present disclosure provides an exemplary technically improved computer-based apparatus that includes at least the following components of: a first substrate; a first processor and a memory coupled to the first substrate; where the first processor is operationally connected to a second processor coupled to a second substrate; where the memory stores computer code having at least one machine learning model; where the first processor executes computer code stored in the memory that causes the first processor to: automatically receive from the second processor, a first output signal intended to be received by a target recipient device; automatically input the first output signal into the at least one machine learning model; where the at least one machine learning model is configured to perform at least: determine that the first output signal includes an error signal that would cause a malfunction of at least one function performed by the target recipient device, and output an instruction that is configured to cause the first processor to generate a second output signal that corrects the error signal; automatically generate the second output signal; and automatically transmit the second output signal to the target recipient device.

In some embodiments, the present disclosure provides an exemplary technically improved computer-based method that includes at least the following steps of: automatically receiving, by a first processor coupled to a first substrate and operationally connected to a second processor coupled to a second substrate, a first output signal intended to be received by a target recipient device; automatically inputting, by the first processor, the first output signal into at least one machine learning model; where the at least one machine learning model is configured to perform at least: determining that the first output signal includes an error signal that would cause a malfunction of at least one function performed by the target recipient device, and output an instruction that is configured to cause the first processor to generate a second output signal that corrects the error signal; automatically generating, by the first processor, the second output signal; and automatically transmitting, by the first processor, the second output signal to the target recipient device.

In some embodiments, the present disclosure provides an exemplary technically improved computer-based apparatus and/or method for error correction as described above where the first substrate and the second substrate are each a printed circuit board.

In some embodiments, the present disclosure provides an exemplary technically improved computer-based apparatus and/or method for error correction as described above where the first substrate and the second substrate are the same substrate.

In some embodiments, the present disclosure provides an exemplary technically improved computer-based apparatus and/or method for error correction as described above where the memory is a read only memory.

In some embodiments, the present disclosure provides an exemplary technically improved computer-based apparatus and/or method for error correction as described above, further including a microcontroller coupled to the first substrate; where the microcontroller includes the first processor, and where the first processor is configured to receive updates to the at least one machine learning model through a communication circuitry in the microcontroller over a communication network.

In some embodiments, the present disclosure provides an exemplary technically improved computer-based apparatus and/or method for error correction as described above where the at least one machine learning model is a sequence-to-sequence model.

In some embodiments, the present disclosure provides an exemplary technically improved computer-based apparatus and/or method for error correction as described above where the at least one machine learning model is a recurrent network model.

In some embodiments, the present disclosure provides an exemplary technically improved computer-based apparatus and/or method for error correction as described above, further including at least one sensor, and where the first processor is configured to receive at least one sensor output from the at least one sensor that is inputted to the at least one machine learning model.

In some embodiments, the present disclosure provides an exemplary technically improved computer-based apparatus and/or method for error correction as described above where the first processor is configured to determine that the error signal causes the malfunction of the at least one function of the target recipient device by applying the at least one sensor output to the at least one machine learning model.

In some embodiments, the present disclosure provides an exemplary technically improved computer-based apparatus and/or method for error correction as described above where the first processor is configured to correct the error signal when the at least one machine learning model determines that a probability that the error signal causes the malfunction exceeds a predefined confidence level.

In some embodiments, the present disclosure provides an exemplary technically improved computer-based apparatus and/or method for error correction as described above where the first processor is configured to ignore the error signal by passing the first output signal inputted to the at least one machine learning model to the second output signal that is transmitted to the target recipient device when the at least one machine learning model determines that a probability that the error signal causes the malfunction is below a predefined confidence level.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1A through 7 illustrate systems and methods of signal error detection and correction using components configured to apply machine learning models to signals produced by signal generation devices (hereinafter referred to as "control devices"). The following embodiments provide technical solutions and technical improvements that overcome technical problems, drawbacks and/or deficiencies in the technical fields involving error detection and error correction in signal communication between devices. As explained in more detail, below, technical solutions and technical improvements herein include aspects of improved components configured to implement machine learnings trained to detect errors in the signals between devices. Based on such technical features, further technical benefits become available to users and operators of these systems and methods. Moreover, various practical applications of the disclosed technology are also described, which provide further practical benefits to users and operators that are also new and useful improvements in the art.

Figure 1A:
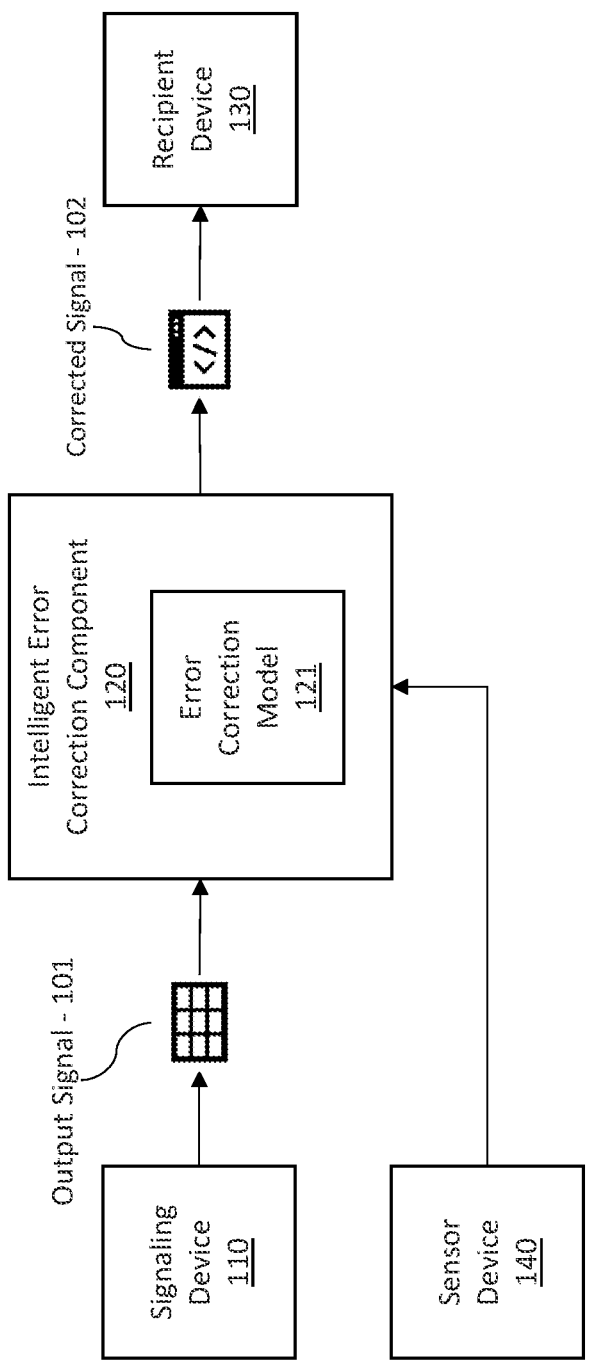
FIGS. 1A-7 show one or more schematic flow diagrams, certain computer-based architectures, and/or screenshots of various specialized graphical user interfaces which are illustrative of some exemplary aspects of at least some embodiments of the present disclosure.

FIG. 1A is a block diagram of an exemplary computer-based system for intelligent error correction of signals between a control device and a controlled device in accordance with one or more embodiments of the present disclosure.

In some embodiments, various devices may include a processor, microcontroller, or other device for signal processing. Such signaling devices 110 may be susceptible to errors from various causes, including, e.g., human error, signal processing error, interference (e.g., from ambient temperature, humidity, magnetic fields, electric fields such as static electricity, etc.), among other sources of error or any combination thereof.

In some embodiments, correcting errors in signals prior to reception by a recipient device 130 can reduce malfunctions, errors in the recipient device 130, or other incorrect behavior in response to the error in the signal. Thus, efficient, latency-free correction of errors in signals can improve the reliability and functioning of the signaling device 110 and the recipient device 130.

In some embodiments, the signaling device 110 may produce an output signal 101. The signaling device 110 may include any suitable device for producing signals. In some embodiments, the output signal 101 may include any suitable signal over a wired or wireless medium. In some embodiments, the output signal 101 may carry data encoded in the signal (e.g., via Universal Serial Bus (USB), PCIe, serial ATA, Ethernet, coaxial cable, fiber optic cabling, WiFi, Bluetooth, etc.), or may not carry data to instead conform to predetermined signal parameters to signal a state or command, or any other suitable signal or any combination thereof.

In some embodiments, for example, the signaling device 110 may include a computer peripheral to provide input to a computing device, such as, e.g., a wired or wireless keyboard or mouse, webcam, microphone, etc. In another example, the signaling device 110 may include the computing device to provide signals to a computer peripheral such as, e.g., a display, a speaker, etc. In some embodiments, the signaling device 110 may include a "smart" or Internet-of-Things (IoT) device such as, e.g., a smart thermostat, smart light switch, smart lightbulb, smart speaker or display, etc. In some embodiments, the signaling device 110 may include a "dumb" device and/or radio frequency (RF) device, such as, e.g., a transmitter including a garage door opening, remote car key, television remote, radio frequency identifier (RFID) chip, near field communications (NFC) chip, or other suitable transmitter not connected to the internet.

In some embodiments, the signaling device 110 may produce the output signal 101 to cause an action or otherwise signal a state or change in state to the recipient device 130. As an illustration, a signaling device 110 including a keyboard may produce output signals 101 based on a user pressing keys, where the output signal 101 is sent to a recipient device 130 including a computing device to enter characters into a software application. In another illustration, a signaling device 110 including a garage door remote may emit an output signal 101 to trigger a recipient device 130 including a garage door opener to activate a motor and open or shut a garage door.

In some embodiments, the output signal 101 may become corrupted en-route to the recipient device 130, or may be generated incorrectly by the signaling device 110, thus resulting in an error signal rather than the intended correct signal. Thus, an intelligent error correction component 120 may be provided to intercept the output signal 101 and predict a corrected signal 102 representing the true, uncorrupted signal. In some embodiments, the intelligent error correction component 120 may include, e.g., a separate processing device from the signaling device 110 and the recipient device 130. Thus, the intelligent error correction component 120 may be added to the signaling device 110, the recipient device 130 or both as an accessory or peripheral. However, in some embodiments, the intelligent error correction component 120 may be integrated into the signal device 110, the recipient device 130 or both, as an integral component of one or both of the signaling device 110 and recipient device 130.

In some embodiments, the intelligent error correction component 120 may be positioned with the signaling device 110 to intercept the output signal 101 prior to transmission of the output signal 101 across the wired or wireless medium. Thus, the intelligent error correction component 120 may receive the output signal 101 directly from the signaling device 110 to more accurately determine the corrected signal 102 prior to transmission and any losses due to transmission through the wired or wireless medium. In some embodiments, the intelligent error correction component 120 may be positioned with the recipient device 130 to intercept the output signal 101 from the transmission of the output signal 101 across the wired or wireless medium. Thus, the intelligent error correction component 120 may correct for any errors at the signaling device 110 as well as errors resulting from losses and other interference (e.g., via humidity, moisture, temperature, physical obstacles, etc.) in the wired or wireless medium. In some embodiments, the intelligent error correction component 120 may have two or more components to position intelligent error correction components 120 at both the signaling device 110 and the recipient device 130.

In some embodiments, the intelligent error correction component 120 may include an error correction model 121. In some embodiments, the error correction model 121 may include one or more machine learning models trained to determine corrected signals 102 from output signals 101 from the signaling device 110. In some embodiments, the error correction model 121 is trained specifically for the type of device of the signaling device 110 (e.g., garage door remote, car remote, television remote, computer keyboard or mouse, etc.). Thus, the error correction model 121 may be trained to recognize patterns and characteristics of the output signal 101 to detect an error and predict a corrected signal 102.

In some embodiments, the error correction model 121 may be positioned and configured such that the output signal 101 is automatically received from the signaling device 110, either before, after or both before and after transmission via the medium. In some embodiments, the error correction model 121 may utilize trained parameters to process the output signal 101 and characteristics thereof. For example, in some embodiments, the intelligent error correction component 120 may extract characteristics as input features for the error correction model 121. Such characteristics may include, e.g., a signal-to-noise ratio, noise level, time stamp, time duration, amplitude, volume, phase, frequency, frequency range, among other characteristics or any combination thereof.

In some embodiments, the output signal 101 may be produced in response to an input to the signaling device 110, such as, e.g., a user command, user selection, button press, switch actuation, a received signal, received data, a software application process or task, among other inputs or any combination thereof. In some embodiments, the input characteristics of the input or both may be indicative of the input causing the signaling device 110 to produce an error signal for the output signal 101. Accordingly, in some embodiments, the intelligent error correction component 120 may also receive the input that caused the output signal 101. Thus, in some embodiments, the error correction model 121 may ingest the input, characteristics thereof, or both in conjunction with the output signal 101. Therefore, the error correction model 121 may use the relationship between the input and the output signal 101 to predict the corrected signal 102.

In some embodiments, the error correction model 121 may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

a. define Neural Network architecture/model,
 b. transfer the input data to the exemplary neural network model,
 c. train the exemplary model incrementally,
 d. determine the accuracy for a specific number of timesteps,
 e. apply the exemplary trained model to process the newly-received input data, and
 f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the error correction model 121 may use the output signal 101, and, if available, the input, characteristics of the output signal 101, characteristics of the input, or any combination thereof, to infer based on parameters of the error correction model 121 that an error is present. Accordingly, the error correction model 121 may be trained based on output signals from the signaling device 110 or devices of a same type as the signaling device 110 by ingesting the output signal, a corresponding the input, corresponding characteristics of the output signal, characteristics of the input, or any combination thereof, and comparing a predicted corrected signal 102 to a known correct signal. Based on a comparison between the predicted corrected signal and the known correct signal, an optimizer of the error correction model 121 may determine a loss associated with the prediction. The loss may be backpropagated to the parameters of the error correction model 121 to more accurately predict the predicted corrected signal to be more similar to the known correct signal. Thus, upon ingesting the output signal 101, the error correction model 121 may accurately output a prediction for the corrected signal 102 using the trained parameters.

In some embodiments, the intelligent error correction component 120 may utilize the error correction model 121 to predict a corrected signal 102 for the feature vector associated with the user's account, e.g., the feature vector as described above with reference to FIG. 3.

In some embodiments, the error correction model 121 ingests the feature vector and produces a prediction of a corrected signal 102 for each feature vector. In some embodiments, to produce the prediction of the corrected signal 102, the error correction model 121 may include a machine learning model including a regression model to predict a signal, such as, e.g., a convolutional neural network (CNN), decision trees, random forest, support vector machine (SVM), autoencoder, or any other suitable algorithm for a regression model.

Accordingly, the error correction model 121 ingests a feature vector representing the input features of the output signal 101 and processes the attributes encoded therein using the regression model to produce a model output vector. In some embodiments, the model output vector may be decoded to generate the corrected signal 102.

In some embodiments, the error correction model 121 may trained based on the corrected signal 102 and, e.g., a user interaction at the recipient device 130 to modify or dispute the corrected signal 102. Based on the difference between the corrected signal 102 and the user interaction, the parameters of the regression model of the error correction model 121 may be updated to improve the accuracy of the recurring data entry classification.

In some embodiments, training is performed using an optimizer. In some embodiments, the corrected signal 102 fed back to the optimizer. The optimizer may also ingest the user interaction. In some embodiments, the optimizer may employ a loss function, such as, e.g., Hinge Loss, Multiclass SVM Loss, Cross Entropy Loss, Negative Log Likelihood, or other suitable classification loss function. The loss function determines an error based on the user interaction and the corrected signal 102. In some embodiments, the optimizer may, e.g., backpropagate the error to the error correction model 121 to update the parameters using, e.g., gradient descent, heuristic, convergence or other optimization techniques and combinations thereof.

In some embodiments, the optimizer may therefore train the parameters of the error correction model 121 to approximate correct signals based on error signals that may cause the recipient device to malfunction. As a result, the error correction model 121 may be continually trained and optimized based on user feedback.

In some embodiments, to improve the efficiency of the intelligent error correction component 120, the error correction model 121 may include a step for detecting the error. For example, the detection of the error may be algorithmically determined based on the characteristics of the output signal 101, or may be determined via machine learning-based detection with a suitable classifier. For example, the error correction model 121 may include, e.g., an attention model, a CNN, a transformer, an autoencoder, a recurrent neural network (RNN), Conditional Random Fields (CRFs), a Naïve Bayes classifier, random forest, a SVM, or other suitable classier or any combination thereof. In some embodiments, the algorithm and/or classifier may produce an output vector indicative of an error classification labeling the output signal 101 as an error signal or as a correct signal.

In some embodiments, the classifier output vector may include or may be decoded to reveal a numerical output, e.g., a probability value between 0 and 1. In some embodiments, the probability value may indicate a degree of confidence that the output signal 101 is an error vector. In some embodiments, the error correction model 121 may test the confidence value against a predefined confidence threshold, where a confidence value exceeds the confidence threshold indicates, e.g., that the output signal 101 precedes a sequence of recurring data entries, or that the output signal 101 is an error signal. For example, the confidence threshold can be, e.g., greater than 0.5, greater than 0.6, greater than 0.7, greater than 0.8, greater than 0.9, or other suitable threshold value. In some embodiments, the error correction model 121 may produce the classification based on the confidence value and the confidence threshold. For example, the classifier output vector may include a classification as an error signal where the confidence value is greater than the confidence threshold. However, the error correction model 121 may be configured such that the classifier output vector may include a classification as a correct signal where the confidence value is greater than the confidence threshold. Where no error is determined in the output signal 101 (e.g., the output signal 101 is determined to be a correct signal), the intelligent error correction component 120 may bypass the error correction model 121 to ignore the error signal and pass the output signal 101 as the corrected signal 102 to the recipient device 130.

In some embodiments, as described above, ambient conditions, device conditions and device state of the signaling device 110 may all contribute to errors being present in the output signal 101 leading to an error signal. Accordingly, the intelligent error correction component 120 may be in communication with a sensor device 140 that is configured to sense or otherwise measure the ambient conditions, device conditions and device state. The sensor device 140 may provide readings to the intelligent error correction component 120 as an additional input feature for the error detection and/or error correction modelling by the error correction model 121. For example, the error correction model 121 may ingest, e.g., temperature, humidity, moisture, location, elevation, magnetic field strength, electric field strength, acoustic interference amplitude and/or frequency, electromagnetic interference amplitude and/or frequency, among others or any combination thereof. In some embodiments, the readings from the sensor device 140 may be used to facilitate error signal detection by indicating an error causing condition. In some embodiments, the readings from the sensor device 140 may be used by the error correction model 121 to facilitate prediction of corrected signal 102 based on training as described above with the additional input of the readings for known correct signals. In some embodiments, the error correction model 121 may use the readings of the sensor device 140 for both error signal detection and prediction of the corrected signal 102.

In some embodiments, upon prediction of the corrected signal 102, the intelligent error correction component 120 may communicate the corrected signal 102 to the recipient device 130. In some embodiments, the intelligent error correction component 120 may be in communication with the recipient device 130 via a suitable wired or wireless medium. Thus, the intelligent error correction component 120 may transmit the corrected signal 102 to the recipient device 130 to effectuate error free communication with the recipient device 130 according to the corrected, error free output signal 101 from the signaling device 110. Thus, communications between the signaling device 110 and the recipient device 130 may be improved by the addition and/or integration of the intelligent error correction component 120 to reduce errors in signals in real-time without prior knowledge of the intended or correct signal, data or other information.

Figure 1B:
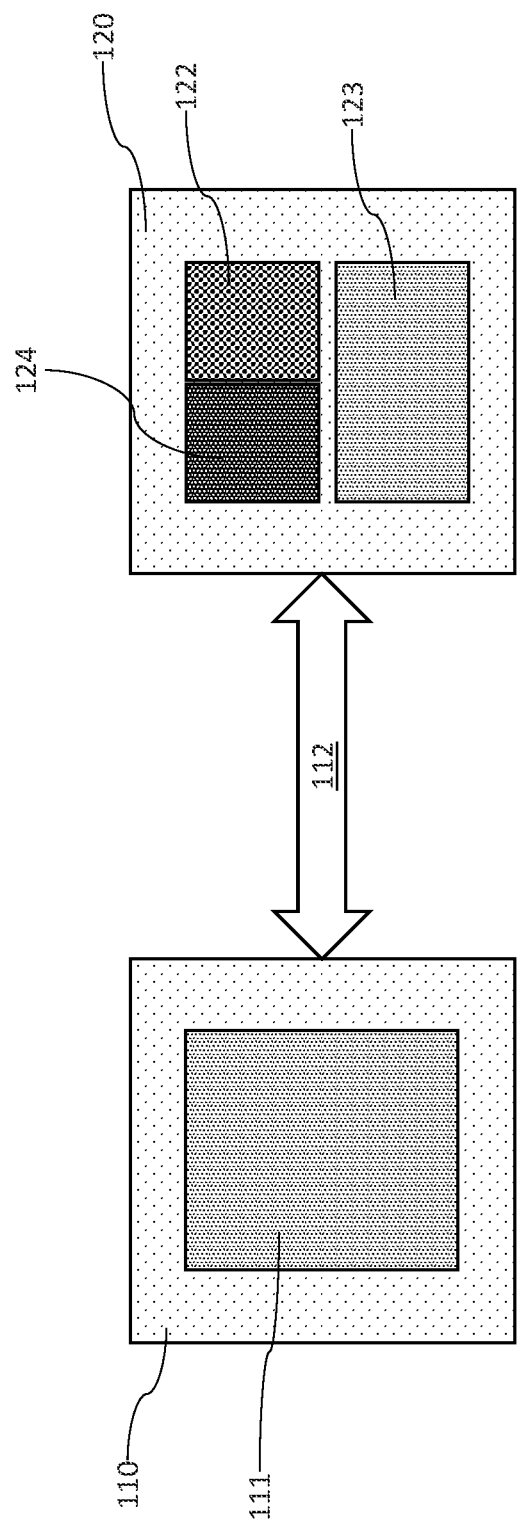

FIG. 1B is a block diagram of another exemplary computer-based system and/or apparatus having an external error correction component for intelligent error correction of signals between a control device and a controlled device in accordance with one or more embodiments of the present disclosure.

In some embodiments, a signaling device 110 such as the signaling device 110 of FIG. 1A may include a substrate on which a processing device 111 is formed. In some embodiments, the signaling device 110 may be an embedded system or component, a system-on-chip, discrete microcontroller, discrete or embedded field programmable gate array (FPGA), discrete or embedded central processing unit (CPU), discrete or embedded graphical processing unit (GPU), discrete or embedded neural processing unit (NPU), or other suitable processing device for generating and transmitting signals. In some embodiments, the signaling device 110 may include a general purpose processor of a computing device (e.g., laptop computer, desktop computer, mobile computing device such as smartphone or tablet, wearable device, etc.), or a specialized processing device such as microcontroller or FPGA of a software-defined radio, embedded microcontroller of a peripheral device or IoT device, or other suitable device.

In some embodiments, the substrate of the signaling device 110 may include a printed circuit board (PCB), silicon processor substrate, graphene processor substrate, or other suitable substrate material. The processing device 111 may be etched (e.g., lithographically), grown, embedded, mounted, or otherwise positioned on the substrate, or any combination thereof via a suitable semiconductor fabrication technique.

Similarly, in some embodiments, an intelligent error correction component 120 such as the intelligent error correction component 120 of FIG. 1A may include a substrate on which a processing device 123 is formed. In some embodiments, the intelligent error correction component 120 may be an embedded system or component, a system-on-chip, discrete microcontroller, discrete or embedded field programmable gate array (FPGA), discrete or embedded central processing unit (CPU), discrete or embedded graphical processing unit (GPU), discrete or embedded neural processing unit (NPU), or other suitable processing device for generating and transmitting signals. In some embodiments, the intelligent error correction component 120 may include a general purpose processor of a computing device (e.g., laptop computer, desktop computer, mobile computing device such as smartphone or tablet, wearable device, etc.), or a specialized processing device such as microcontroller or FPGA of a software-defined radio, embedded microcontroller of a peripheral device or IoT device, or other suitable device.

In some embodiments, the substrate of the intelligent error correction component 120 may include a printed circuit board (PCB), silicon processor substrate, graphene processor substrate, or other suitable substrate material. In some embodiments, a communication component 122 may be included on the substrate. In some embodiments, the communication component 122 may include, e.g., a transmitter, receiver, transceiver, encoder, decoder, codec, among other sub-components or any combination thereof in order to send and receive signals over the wired or wireless medium. In some embodiments, the communication component 122 may be etched (e.g., lithographically), grown, embedded, mounted, or otherwise positioned on the substrate, or any combination thereof via a suitable semiconductor fabrication technique.

The processing device 123 may be etched (e.g., lithographically), grown, embedded, mounted, or otherwise positioned on the substrate, or any combination thereof via a suitable semiconductor fabrication technique.

In some embodiments, a memory 124 including a non-transitory computer readable medium may also be formed on the substrate of the intelligent error correction component 120. In some embodiments, the memory 124 be etched (e.g., lithographically), grown, embedded, mounted, or otherwise positioned on the substrate, or any combination thereof via a suitable semiconductor fabrication technique.

In some embodiments, the memory 124 may store the error correction model 121. Thus, upon receiving an output signal 101 via the communication component 122, the processing device 123 may load the error correction model 121 from the memory 124 to utilize the error correction model 121 and predicted the corrected signal 102 as described above. The processing device 123 may control the communication component 122 to transmit the predicted corrected signal 102 to the recipient device.

In some embodiments, the intelligent error correction component 120 may be separate from the signaling device 110. As a result, the signaling device 110 and the intelligent error correction component 120 are formed from separate substrates, a first substrate and a second substrate, respectively. In some embodiments, the first substrate is the same material as the second substrate. In some embodiments, the first substrate is a different material from the second substrate.

In some embodiments, the signaling device 110 communicates the output signal 101 to the intelligent error correction component 120 using a communication channel 112. In some embodiments, the communication channel 112 may include any suitable channel for transmitting signals from the signaling device 110 to the recipient device 130 such that the intelligent error correction component 120 may intercept the signals for error correction prior to receipt by the recipient device 130. Accordingly, the communication channel 112 may include one or more suitable wired or wireless mediums forming a direct or networked communication channel between devices. For example, the communication channel 112 may include wireless communication technology such as, e.g., WiFi, cellular, Zigbee, Z-Wave, Bluetooth, among others or any combination thereof, and/or a wired communication technology such as, e.g., Ethernet, USB, PCIe, SATA, Firewire, Thunderbolt, fiber optic cabling, coaxial cabling, among others or any combination thereof.

Figure 1C:
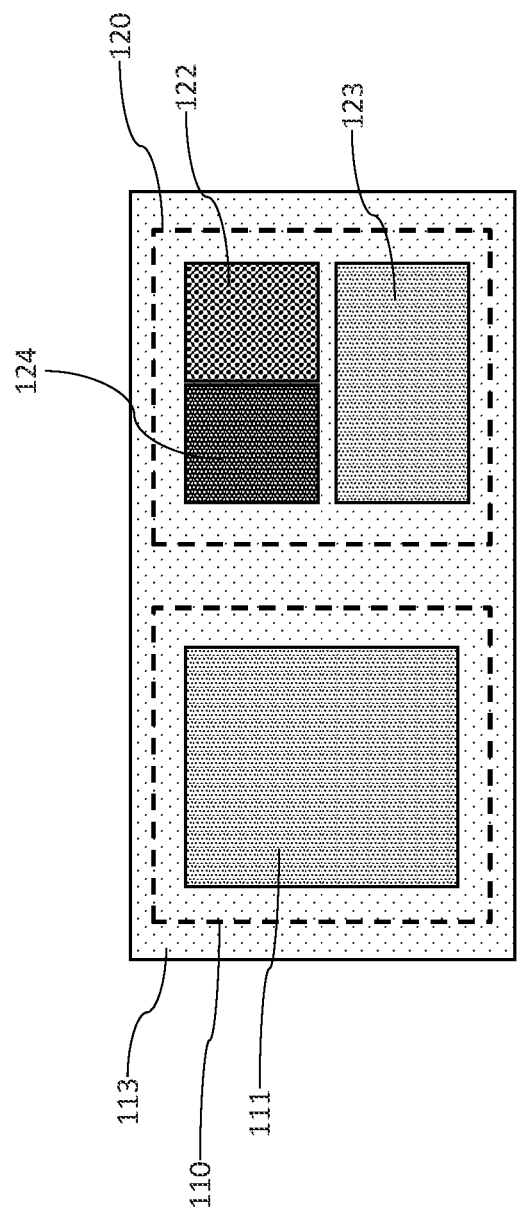

FIG. 1C is a block diagram of another exemplary computer-based system and/or apparatus having an integrated error correction component for intelligent error correction of signals between a control device and a controlled device in accordance with one or more embodiments of the present disclosure.

In some embodiments, a signaling device 110 such as the signaling device 110 of FIG. 1A may include a substrate on which a processing device 111 is formed. In some embodiments, the signaling device 110 may be an embedded system or component, a system-on-chip, discrete microcontroller, discrete or embedded field programmable gate array (FPGA), discrete or embedded central processing unit (CPU), discrete or embedded graphical processing unit (GPU), discrete or embedded neural processing unit (NPU), or other suitable processing device for generating and transmitting signals. In some embodiments, the signaling device 110 may include a general purpose processor of a computing device (e.g., laptop computer, desktop computer, mobile computing device such as smartphone or tablet, wearable device, etc.), or a specialized processing device such as microcontroller or FPGA of a software-defined radio, embedded microcontroller of a peripheral device or IoT device, or other suitable device.

In some embodiments, the substrate of the signaling device 110 may include a printed circuit board (PCB), silicon processor substrate, graphene processor substrate, or other suitable substrate material. The processing device 111 may be etched (e.g., lithographically), grown, embedded, mounted, or otherwise positioned on the substrate, or any combination thereof via a suitable semiconductor fabrication technique.

In some embodiments, an intelligent error correction component 120 such as the intelligent error correction component 120 of FIG. 1A may also be included on the substrate In some embodiments, the intelligent error correction component 120 may be an embedded system or component, a system-on-chip, discrete microcontroller, discrete or embedded field programmable gate array (FPGA), discrete or embedded central processing unit (CPU), discrete or embedded graphical processing unit (GPU), discrete or embedded neural processing unit (NPU), or other suitable processing device for generating and transmitting signals.

In some embodiments, the intelligent error correction component 120 may include a general purpose processor of a computing device (e.g., laptop computer, desktop computer, mobile computing device such as smartphone or tablet, wearable device, etc.), or a specialized processing device such as microcontroller or FPGA of a software-defined radio, embedded microcontroller of a peripheral device or IoT device, or other suitable device.

In some embodiments, the substrate of the intelligent error correction component 120 may be formed on the same substrate as the signaling device 110 for produce an integrated intelligent error correction component 120. Thus, sub-components of the integrated intelligent error correction component 120 may be formed together with the processing device 111 on the same printed circuit board (PCB), silicon processor substrate, graphene processor substrate, or other suitable substrate material.

In some embodiments, the sub-components of the intelligent error correction component 120 may include a communication component 122 included on the substrate. In some embodiments, the communication component 122 may include, e.g., a transmitter, receiver, transceiver, encoder, decoder, codec, among other sub-components or any combination thereof in order to send and receive signals over the wired or wireless medium. In some embodiments, the communication component 122 may be etched (e.g., lithographically), grown, embedded, mounted, or otherwise positioned on the substrate, or any combination thereof via a suitable semiconductor fabrication technique.

In some embodiments, the sub-components of the intelligent error correction component 120 may include a processing device 123. In some embodiments, the processing device 123 may be etched (e.g., lithographically), grown, embedded, mounted, or otherwise positioned on the substrate, or any combination thereof via a suitable semiconductor fabrication technique.

In some embodiments, the sub-components of the intelligent error correction component 120 may include a memory 124. In some embodiments, the memory 124 may include a non-transitory computer readable medium may also be formed on the substrate of the intelligent error correction component 120. In some embodiments, the memory 124 be etched (e.g., lithographically), grown, embedded, mounted, or otherwise positioned on the substrate, or any combination thereof via a suitable semiconductor fabrication technique.

In some embodiments, the memory 124 may store the error correction model 121. Thus, upon receiving an output signal 101 via the communication component 122, the processing device 123 may load the error correction model 121 from the memory 124 to utilize the error correction model 121 and predicted the corrected signal 102 as described above. The processing device 123 may control the communication component 122 to transmit the predicted corrected signal 102 to the recipient device.

In some embodiments, because the signaling device 110 and the intelligent error correction component 120 are formed on the same substrate, the output signal 101 may be provided form the signaling device 110 to the integrated intelligent error correction component 120, e.g., via a bus or other circuitry.

Figure 2A:
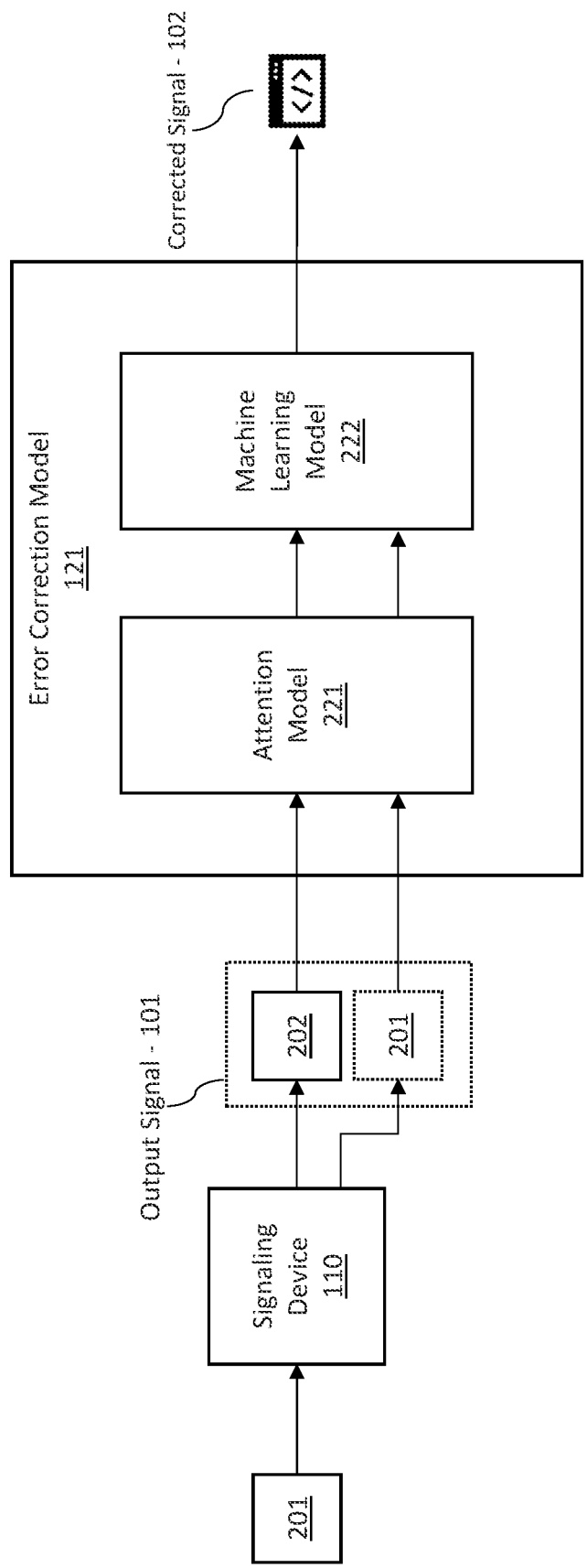

FIG. 2A is a block diagram of another exemplary computer-based system for using machine learning models for intelligent error correction of an output signal from a control device to infer a corrected signal to a controlled device in accordance with one or more embodiments of the present disclosure.

In some embodiments, the signaling device 110 may be receive an input 201. In some embodiments, the input 201 may include, e.g., signal triggered by a button, switch or other hardware device. In some embodiments, the input 201 may include a software generating indicator or data, such as, e.g., a software instruction, task, function, value or other input associated with, e.g., a user selection, a user input, a detected condition, or other suitable software based control.

In some embodiments, the input 201 provides a basis for the generation of the output signal 101 by the signaling device 110. The signaling device 110 may include hardware circuitry and/or software functionality that is configured to receive the input 201 and generate an output 202. In some embodiments, the output 202 is directly related to the input 201 (e.g., a predetermined, hardcoded, physically designed or other deterministically determined reaction to the input 201). In some embodiments, the output 202 may indirectly result from the input 201, such as, e.g., by intervening processing of the input 201 via, e.g., software, conditional analysis, sensor input, or other inputs and processes to effect the output 202.

In some embodiments, the signaling device 110 may produce unintended outputs 202 that result from unforeseen or unintended interference in the operation of the signaling device 110 or in the input 201. For example, temperature, humidity, moisture, magnetic fields, and other external interference can affect the operation of the circuitry and/or software of the signaling device 110. Thus, the output 202 may be influenced by the effects on the operation of the signaling device 110 to result in an error signal that is different from intended or designed for output 202 for the input 201.

Accordingly, in some embodiments, the error correction model 121 may intercept the output signal 101 including the input 201 and the output 202 from the signaling device 110 to determine whether an error is likely to be in the output 202 and predict a corrected signal 102. Thus, in some embodiments, the error correction model 121 ingest the input 201 and output 202 provided by the output signal 101 to identify the existence of an error and correct the error automatically and in real-time.

In some embodiments, depending on the signaling device 110, the output 202 may be complex, having many characteristics describing the signal, carrying a large amount of data, etc. Thus, while the error correction model 121 may implement a detection algorithm and/or detection model to process the input 201 and output 202 to determine whether an error exists, an attention model 221 may be instead or in addition be employed to focus attention of the error correction model 121 on outputs 202 and/or characteristics that are most likely error signals.

In some embodiments, attention models may include input processing techniques for neural networks that allow the network to focus on specific aspects of a complex input, such as characteristics and/or data carried by the output signal 101, one at a time until the entire dataset is categorized. The goal is to break down complicated tasks into smaller areas of attention that are processed sequentially. In some embodiments, by dividing the tasks into simpler tasks and solving them one by one, a machine learning model 222 may more efficiently and accurately predict the corrected signal 102.

In some embodiments, the error correction model 121 may extract characteristics of the input 201 and the output 202. Such characteristics may include, e.g., a signal-to-noise ratio, noise level, time stamp, time duration, amplitude, volume, phase, frequency, frequency range, among other characteristics, operation count instruction count, instruction type, mechanism used to produce the input 201 and/or output 202, among others or any combination thereof. In some embodiments, the input 201, the output 202 and the characteristics thereof may be used to construct input features, such as a feature vector, feature vectors, feature map, or other feature construction.

In some embodiments, the attention model 221 ingests the features to determine attention weights for segments of the features. In some embodiments, the attention model 221 may include a function to map the features and "s set" of key value pairs to an output. For example, each of the features, the keys, the values and output are all vectors. In some embodiments, the output feature is then calculated as a weighted sum of the values, with the weight assigned to each value expressed by a compatibility function of the query with the corresponding key value.

Thus, in some embodiments, the attention model 221 may give greater weight to certain values of the input feature to produce the output. The weighting of the values thus directs the attention of the machine learning model 222 more to the higher weighted feature values than the lower weighted feature values. In some embodiments, the attention model 221 may output the output to the machine learning model 222 for use as input features to the machine learning model 222.

In some embodiments, the input features are ingested by the machine learning model 222 to predict the corrected signal 102 based on the input 201, output 202 and characteristics thereof. In some embodiments, the machine learning model 222 may include any suitable neural network trained in a supervised or semi-supervised fashion, such as, e.g., a convolutional neural network (CNN), a recurrent neural network (RNN), autoencoder, sequence-to-sequence neural network (seq2seq), or other suitable model or any combination thereof.

In some embodiments, the output signal 101 may be one signal in a time-series of signals from the signaling device. For example, computer peripherals (e.g., a keyboard, mouse, webcam, microphone, speaker, etc.) may communicate a series multiple signals through time, of which the output signal 101 is just one. The machine learning model 222 may use the variations through time to influence the correction of an error. Thus, the machine learning model 222 may use a suitable model for predicting signals in a time-series of signal. Accordingly, in some embodiments, the machine learning model 222 may include one or more recurrent neural network(s) using, e.g., long short-term memory (LSTM) nodes, gated recovery unit (GRU) nodes, or other suitable neurons for predicting time-series data.

In some embodiments, because the error correction model 121 receives a first signal (the output signal 101) and outputs a second signal (the corrected signal 102), a model architecture may be employed that generates an output having a same dimension as the input such as a sequence transformation algorithm. For example, in some embodiments, a seq2seq architecture of the RNN may be employed.

Figure 2B:
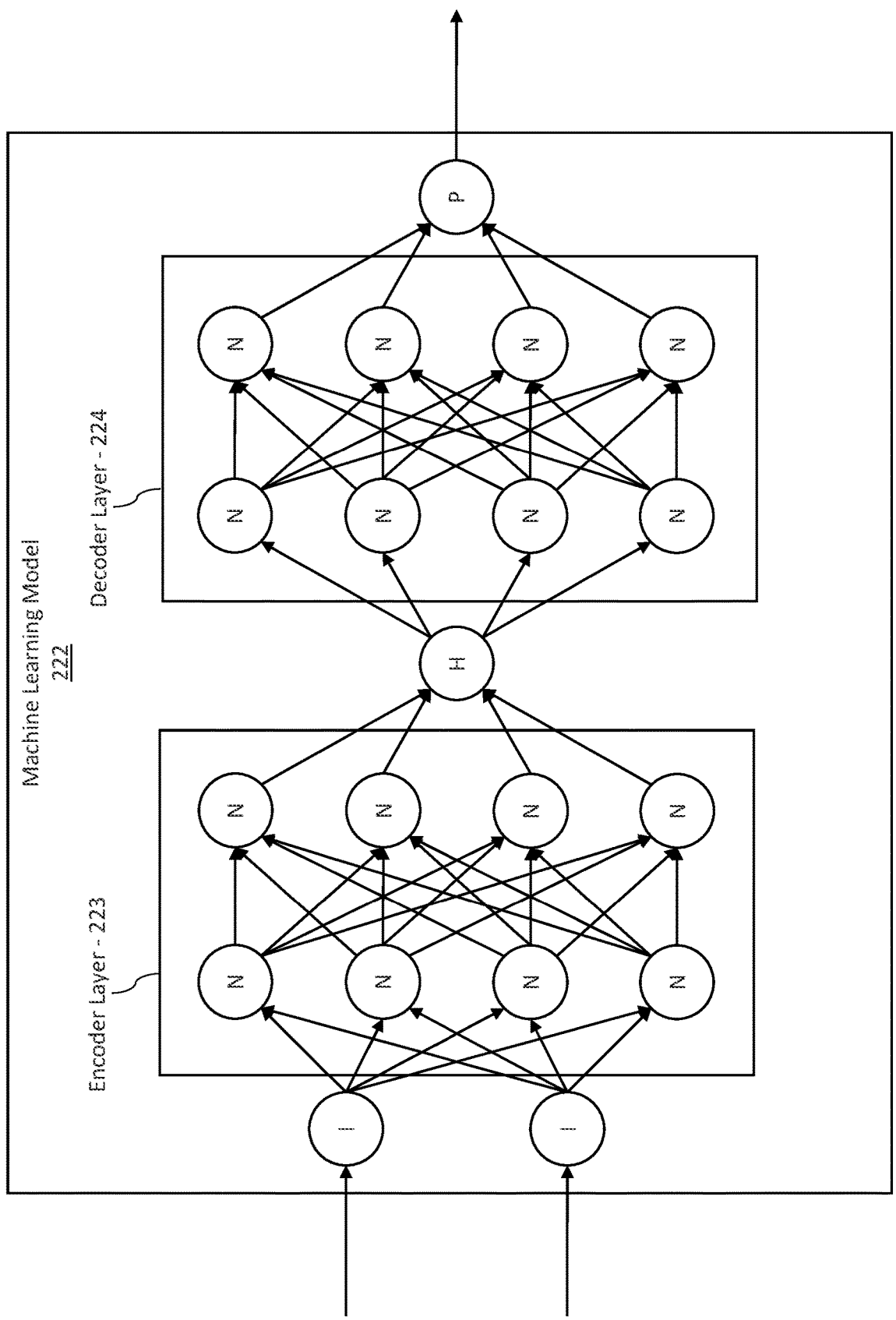

As illustrated in FIG. 2B, in such a sequence transformation architecture, the machine learning model 222 may include an encoder layer 223 that ingests input features I. In some embodiments, the input features I include the output from the attention model 221 corresponding to each of the input 201 and the output 202. Accordingly, in the illustration in FIG. 2B, there are two input features I, one for the attention weighted input 201 and one or the attention weighted output 202.

In the FIG. 2B illustration, the input features I are processed by a network of neurons N in the encoder layer 223. In some embodiments, the neurons N may include the LSTM and/or GRU units to facilitate time-series based prediction. In some embodiments, the neurons N may be networks in fully connected or partially connected fashion to encode the input features I into a hidden layer H. In some embodiments, the hidden layer H may include one or more vectors and/or arrays encoding the input features I according to the trained parameters of the neurons N.

In some embodiments, to generate the prediction P for the corrected signal 102, a decoder layer 224 include a network of neurons, e.g., including LSTM and/or GRU units, may decode the hidden layer H. Similar to the neurons N of the encoder layer 223, the neurons N of the decoder layer 224 may include trained parameters for time-series-based decoding of the hidden layer H. As a result, the prediction P includes a decoded hidden layer H that is transformed to a sequence forming a signal having a same dimension as the output 202.

Referring again to FIG. 2A, the machine learning model 222 (including the neurons N of each of the encoder layer 223 and the decoder layer 224) and the attention model 221 may be trained based on the corrected signal 102 and a known correct signal. For example, in some embodiments, the output signal 101 may be a part of a training pair with the known correct signal. Thus, in some embodiments, and optimizer (not shown) may use the output signal 101 (e.g., the output 202) and the corrected signal 102 to determine a loss based on a suitable loss function. In some embodiments, the loss may be backpropagated to update parameters of both the attention model 221 and the machine learning model 222. As a result, both the attention model 221 and the machine learning model 222 may be trained concurrently to efficiently train the error correction model 121 to both recognize and correct error signals, thus prevent incorrect behavior by the recipient device 130.

In some embodiments, one or both of the attention model 221 and the machine learning model 222 may be trained in advance using training data. In some embodiments, one or both of the attention model 221 and the machine learning model 222 may be trained in an online fashion, e.g., using reinforcement training or by human correction to the corrected signal 102, or by any other suitable technique or any combination thereof. In some embodiments, a combination of pre-training and online training may be employed.

Figure 3A:
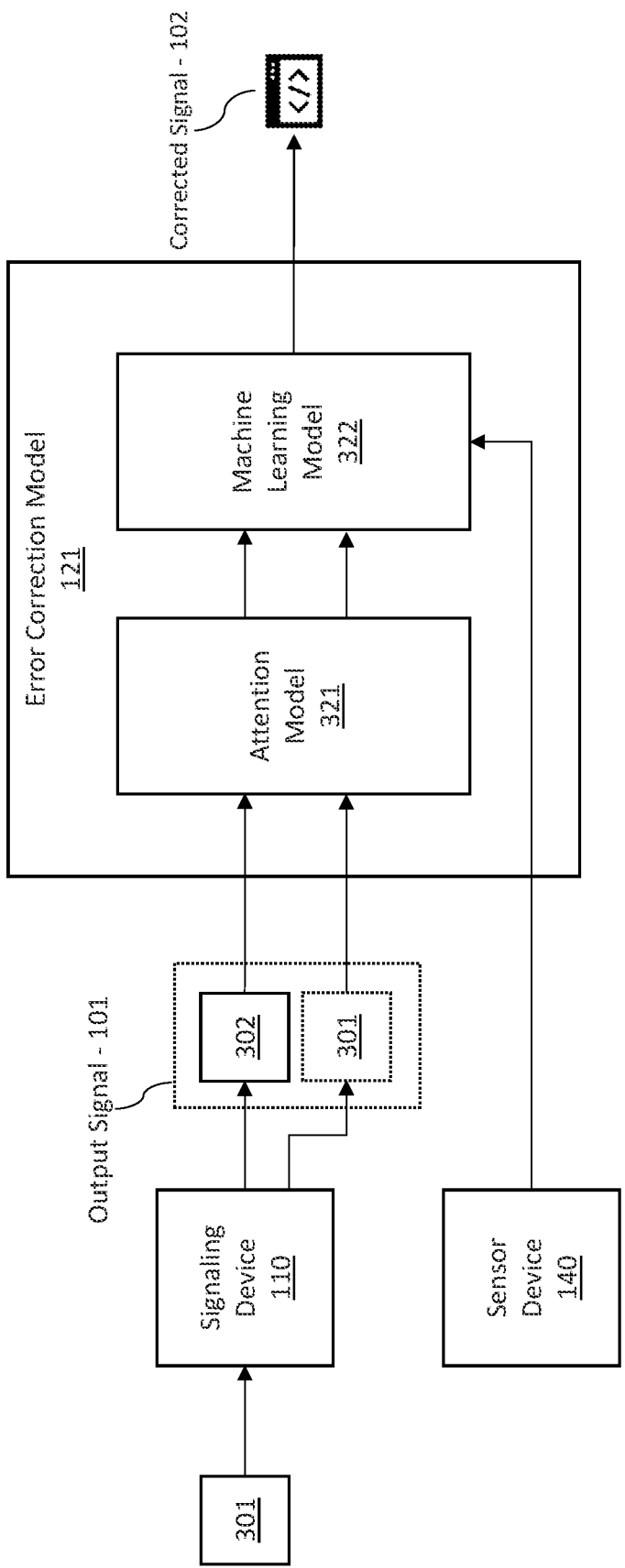

FIG. 3A is a block diagram of another exemplary computer-based system using machine learning models for intelligent error correction of an output signal from a control device to infer a corrected signal to a controlled device in accordance with one or more embodiments of the present disclosure.

In some embodiments, the signaling device 110 may be receive an input 301. In some embodiments, the input 301 may include, e.g., signal triggered by a button, switch or other hardware device. In some embodiments, the input 301 may include a software generating indicator or data, such as, e.g., a software instruction, task, function, value or other input associated with, e.g., a user selection, a user input, a detected condition, or other suitable software based control.

In some embodiments, the input 301 provides a basis for the generation of the output signal 101 by the signaling device 110. The signaling device 110 may include hardware circuitry and/or software functionality that is configured to receive the input 301 and generate an output 302. In some embodiments, the output 302 is directly related to the input 301 (e.g., a predetermined, hardcoded, physically designed or other deterministically determined reaction to the input 301). In some embodiments, the output 302 may indirectly result from the input 301, such as, e.g., by intervening processing of the input 301 via, e.g., software, conditional analysis, sensor input, or other inputs and processes to effect the output 302.

In some embodiments, the signaling device 110 may produce unintended outputs 302 that result from unforeseen or unintended interference in the operation of the signaling device 110 or in the input 301. For example, temperature, humidity, moisture, magnetic fields, and other external interference can affect the operation of the circuitry and/or software of the signaling device 110. Thus, the output 302 may be influenced by the effects on the operation of the signaling device 110 to result in an error signal that is different from intended or designed for output 302 for the input 301.

Accordingly, in some embodiments, the error correction model 121 may intercept the output signal 101 including the input 301 and the output 302 form the signaling device 110 to determine whether an error is likely to be in the output 302 and predict a corrected signal 102. Thus, in some embodiments, the error correction model 121 ingest the input 301 and output 302 provided by the output signal 101 to identify the existence of an error and correct the error automatically and in real-time.

In some embodiments, depending on the signaling device 110, the output 302 may be complex, having many characteristics describing the signal, carrying a large amount of data, etc. Thus, while the error correction model 121 may implement a detection algorithm and/or detection model to process the input 301 and output 302 to determine whether an error exists, an attention model 321 may be instead or in addition be employed to focus attention of the error correction model 121 on outputs 302 and/or characteristics that are most likely error signals.

In some embodiments, attention models may include input processing techniques for neural networks that allow the network to focus on specific aspects of a complex input, such as characteristics and/or data carried by the output signal 101, one at a time until the entire dataset is categorized. The goal is to break down complicated tasks into smaller areas of attention that are processed sequentially. In some embodiments, by dividing the tasks into simpler tasks and solving them one by one, a machine learning model 322 may more efficiently and accurately predict the corrected signal 102.

In some embodiments, the error correction model 121 may extract characteristics of the input 301 and the output 302. Such characteristics may include, e.g., a signal-to-noise ratio, noise level, time stamp, time duration, amplitude, volume, phase, frequency, frequency range, among other characteristics, operation count instruction count, instruction type, mechanism used to produce the input 301 and/or output 302, among others or any combination thereof. In some embodiments, the input 301, the output 302 and the characteristics thereof may be used to construct input features, such as a feature vector, feature vectors, feature map, or other feature construction.

In some embodiments, the attention model 321 ingests the features to determine attention weights for segments of the features. In some embodiments, the attention model 321 may include a function to maps the features and "s set" of key value pairs to an output. For example, each of the features, the keys, the values and output are all vectors. In some embodiments, the output feature is then calculated as a weighted sum of the values, with the weight assigned to each value expressed by a compatibility function of the query with the corresponding key value.

Thus, in some embodiments, the attention model 321 may give greater weight to certain values of the input feature to produce the output. The weighting of the values thus directs the attention of the machine learning model 322 more to the higher weighted feature values than the lower weighted feature values. In some embodiments, the attention model 321 may output the output to the machine learning model 322 for use as input features to the machine learning model 322.

In some embodiments, as described above, ambient conditions, device conditions and device state of the signaling device 110 may all contribute to errors being present in the output signal 101 leading to an error signal. Accordingly, the sensor device 140 may provide additional data to the machine learning model 322 to inform the prediction of the corrected signal 102.

In some embodiments, the sensor device 140 may be configured to sense or otherwise measure the ambient conditions, device conditions and device state. The sensor device 140 may provide readings to the error correction model 121 and the error correction model may produce an additional input feature, e.g., as a feature vector. In some embodiments, the machine learning model 322 may ingest the input feature vectors, including the additional feature vector of the sensor device 140 readings. For example, the machine learning model 322 may ingest an input feature representing, e.g., temperature, humidity, moisture, location, elevation, magnetic field strength, electric field strength, acoustic interference amplitude and/or frequency, electromagnetic interference amplitude and/or frequency, among others or any combination thereof. In some embodiments, the readings from the sensor device 140 may be used to facilitate error signal detection by indicating an error causing condition. In some embodiments, the readings from the sensor device 140 may be used by the error correction model 121 to facilitate prediction of corrected signal 102 based on training as described above with the additional input of the readings for known correct signals. In some embodiments, the machine learning model 322 may use the readings of the sensor device 140 for both error signal detection and prediction of the corrected signal 102.

In some embodiments, the input features are ingested by the machine learning model 322 to predict the corrected signal 102 based on the sensor device 140 readings, the input 301, output 302 and characteristics thereof. In some embodiments, the machine learning model 322 may include any suitable neural network trained in a supervised or semi-supervised fashion, such as, e.g., a convolutional neural network (CNN), a recurrent neural network (RNN), auto-encoder, sequence-to-sequence neural network (seq2seq), or other suitable model or any combination thereof.

In some embodiments, the output signal 101 may be one signal in a time-series of signals from the signaling device 110 and the sensor device 140. For example, computer peripherals (e.g., a keyboard, mouse, webcam, microphone, speaker, etc.) may communicate a series of multiple signals through time, of which the output signal 101 is just one. The machine learning model 322 may use the variations through time to influence the correction of an error. Thus, the machine learning model 322 may use a suitable model for predicting signals in a time-series of signal. Accordingly, in some embodiments, the machine learning model 322 may include one or more recurrent neural network(s) using, e.g., long short-term memory (LSTM) nodes, gated recovery unit (GRU) nodes, or other suitable neurons for predicting time-series data.

In some embodiments, because the error correction model 121 receives a first signal (the output signal 101) and outputs a second signal (the corrected signal 102), a model architecture may be employed that generates an output having a same dimension as the input such as a sequence transformation algorithm. For example, in some embodiments, a seq2seq architecture of the RNN may be employed to.

As illustrated in FIG. 3B, in such a sequence transformation architecture, the machine learning model 322 may include an encoder layer 323 that that ingests input features I. In some embodiments, the input features I include the output from the attention model 321 corresponding to each of the input 301 and the output 302, as well as the input features of the readings from the sensor device 140. Accordingly, in the illustration in FIG. 3B, there are two input features I, one for the attention weighted input 301 and one or the attention weighted output 302.

In the FIG. 3B illustration, the input features I are processed by a network of neurons N in the encoder layer 323. In some embodiments, the neurons N may include the LSTM and/or GRU units to facilitate time-series based prediction. In some embodiments, the neurons N may be networks in fully connected or partially connected fashion to encode the input features I into a hidden layer H. In some embodiments, the hidden layer H may include one or more vectors and/or arrays encoding the input features I according to the trained parameters of the neurons N.

In some embodiments, to generate the prediction P for the corrected signal 102, a decoder layer 324 include a network of neurons, e.g., including LSTM and/or GRU units, may decode the hidden layer H. Similar to the neurons N of the encoder layer 323, the neurons N of the decoder layer 324 may include trained parameters for time-series-based decoding of the hidden layer H. As a result, the prediction P includes a decoded hidden layer H that is transformed to a sequence forming a signal having a same dimension as the output 302.

Referring again to FIG. 3A, the machine learning model 322 (including the neurons N of each of the encoder layer 323 and the decoder layer 324) and the attention model 321 may be trained based on the corrected signal 102 and a known correct signal. For example, in some embodiments, the output signal 101 and readings from the sensor device 140 may be a part of a training set with the known correct signal. Thus, in some embodiments, and optimizer (not shown) may use the output signal 101 (e.g., the output 302), the readings from the sensor device 140 and the corrected signal 102 to determine a loss based on a suitable loss function. In some embodiments, the loss may be backpropagated to update parameters of both the attention model 321 and the machine learning model 322. As a result, both the attention model 321 and the machine learning model 322 may be trained concurrently to efficiently train the error correction model 121 to both recognize and correct error signals, thus prevent incorrect behavior by the recipient device 130.

In some embodiments, one or both of the attention model 321 and the machine learning model 322 may be trained in advance using training data. In some embodiments, one or both of the attention model 321 and the machine learning model 322 may be trained in an online fashion, e.g., using reinforcement training or by human correction to the corrected signal 102, or by any other suitable technique or any combination thereof. In some embodiments, a combination of pre-training and online training may be employed.

Figure 4:
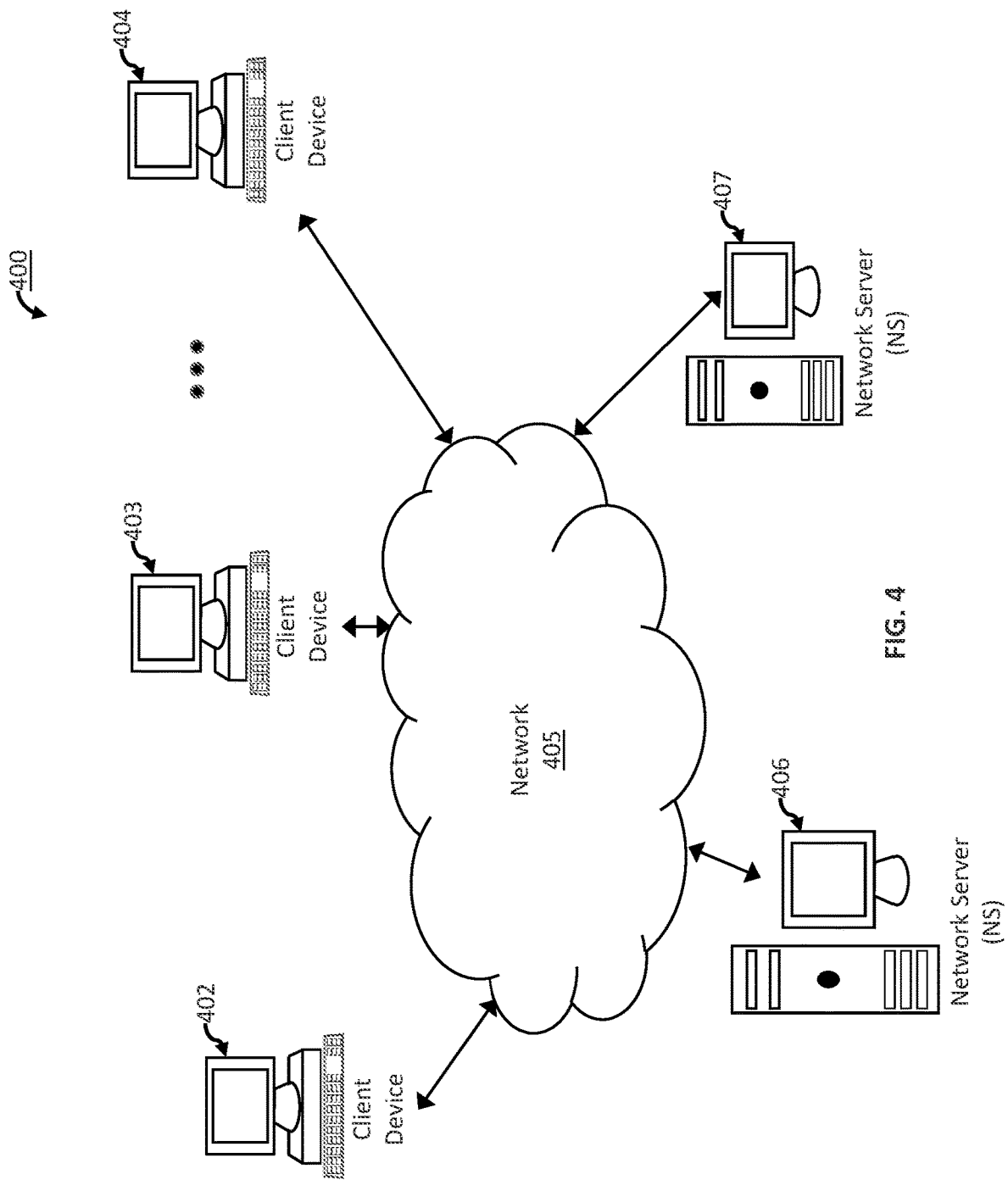

FIG. 4 depicts a block diagram of an exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to manage a large number of members and concurrent transactions, as detailed herein. In some embodiments, the exemplary computer-based system and platform 400 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 4, member computing device 402, member computing device 403 through member computing device 404 (e.g., clients) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CB-s citizens band radio, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++, Python, PUP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Apache on Linux or Microsoft IIS (Internet Information Services). In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 5:
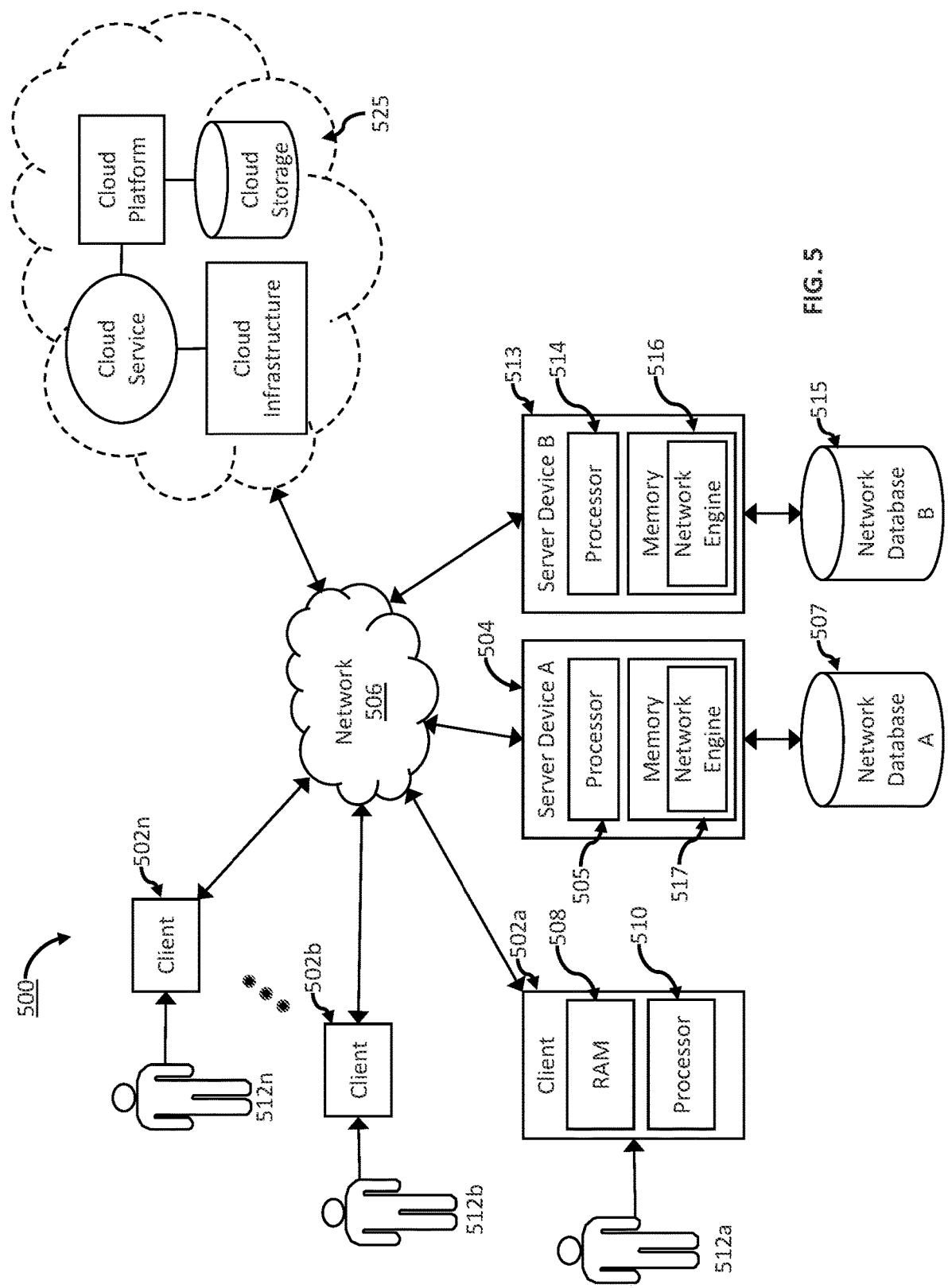

FIG. 5 depicts a block diagram of another exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 502a, member computing device 502b through member computing device 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of member computing device 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, user 512a, user 512b through user 512n, may communicate over the exemplary network 506 with each other and/or with other systems and/or devices coupled to the network 506. As shown in FIG. 5, exemplary server devices 504 and 513 may include processor 505 and processor 514, respectively, as well as memory 517 and memory 516, respectively. In some embodiments, the server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
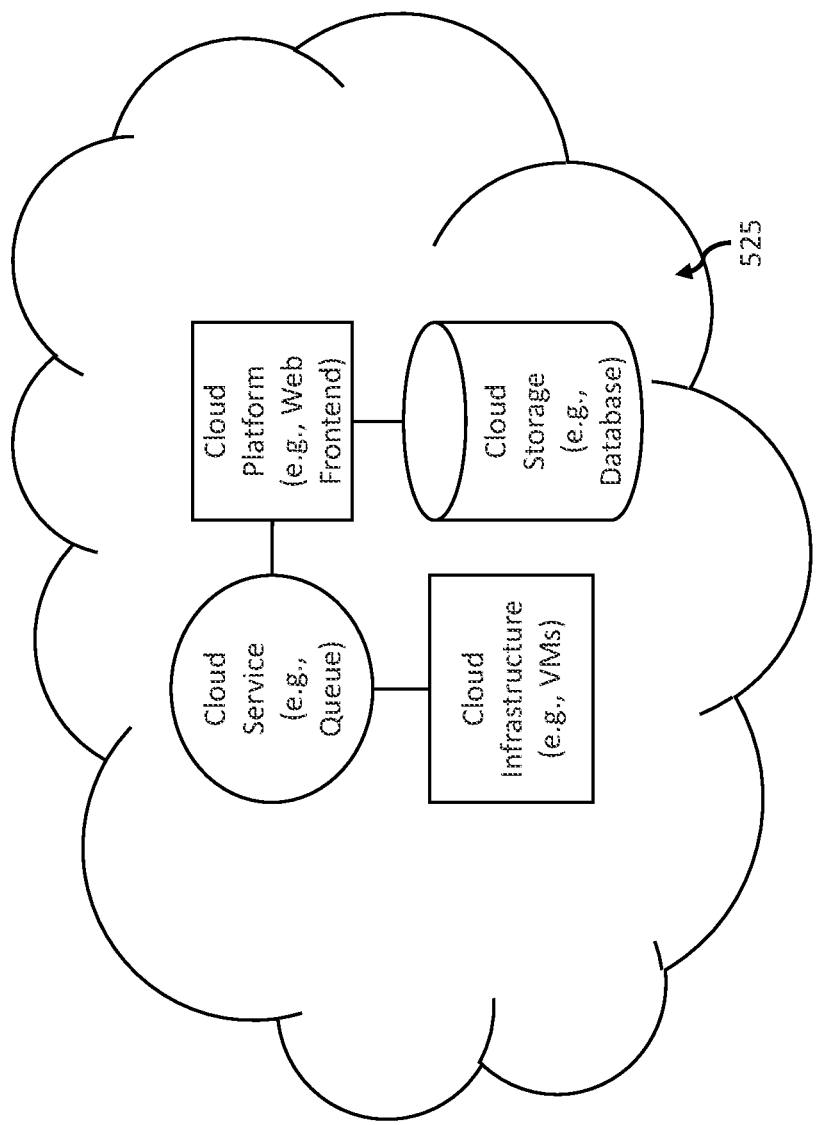
Figure 7:
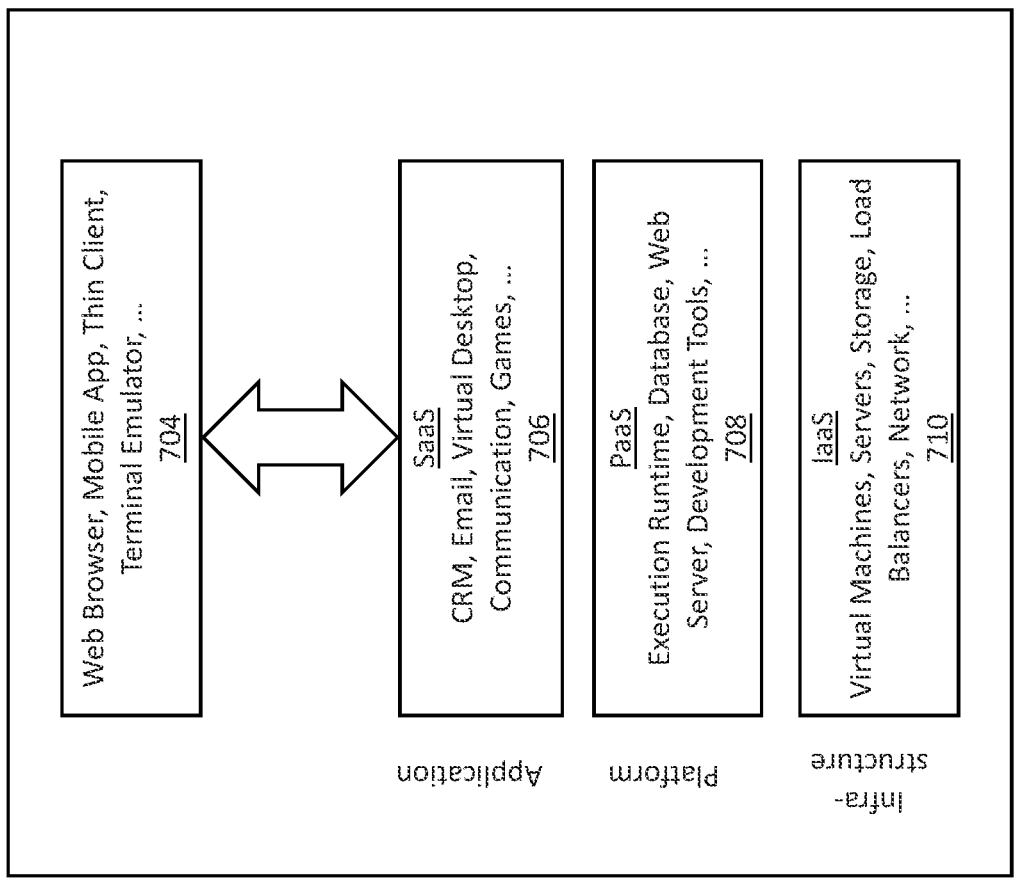

In some embodiments, the exemplary inventive computer-based systems/platforms, the exemplary inventive computer-based devices, and/or the exemplary inventive computer-based components of the present disclosure may be specifically configured to operate in a cloud computing/architecture 525 such as, but not limiting to: infrastructure a service (IaaS) 710, platform as a service (PaaS) 708, and/or software as a service (SaaS) 706 using a web browser, mobile app, thin client, terminal emulator or other endpoint 704. FIGS. 6 and 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, the initiator and passive target can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or the term "server" can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™ Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; which is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

Clause 1. An apparatus comprising:
 a first substrate;
 a first processor and a memory coupled to the first substrate;
  wherein the first processor is operationally connected to a second processor coupled to a second substrate;
  wherein the memory stores computer code having at least one machine learning model;
  wherein the first processor executes computer code stored in the memory that causes the first processor to:
   automatically receive from the second processor, a first output signal intended to be received by a target recipient device;
   automatically input the first output signal into the at least one machine learning model;
   wherein the at least one machine learning model is configured to perform at least:
    (i) determine that the first output signal comprises an error signal that would cause a malfunction of at least one function performed by the target recipient device; and
    (ii) output an instruction that is configured to cause the first processor to generate a second output signal that corrects the error signal;
   automatically generate the second output signal; and
   automatically transmit the second output signal to the target recipient device.

Clause 2. A method, comprising:
 automatically receiving, by a first processor coupled to a first substrate and operationally connected to a second processor coupled to a second substrate, a first output signal intended to be received by a target recipient device;
 automatically inputting, by the first processor, the first output signal into at least one machine learning model;
  wherein the at least one machine learning model is configured to perform at least:
   (i) determining that the first output signal comprises an error signal that would cause a malfunction of at least one function performed by the target recipient device; and
   (ii) output an instruction that is configured to cause the first processor to generate a second output signal that corrects the error signal;
 automatically generating, by the first processor, the second output signal; and
 automatically transmitting, by the first processor, the second output signal to the target recipient device.

Clause 3. The apparatus and/or method according to clause 1 and/or clause 2, wherein the first substrate and the second substrate are each a printed circuit board.

Clause 4. The apparatus and/or method according to clause 1 and/or clause 2, wherein the first substrate and the second substrate are the same substrate.

Clause 5. The apparatus and/or method according to clause 1 and/or clause 2, wherein the memory is a read only memory.

Clause 6. The apparatus and/or method according to clause 1 and/or clause 2, further comprising a microcontroller coupled to the first substrate; wherein the microcontroller comprises the first processor, and wherein the first processor is configured to receive updates to the at least one machine learning model through a communication circuitry in the microcontroller over a communication network.

Clause 7. The apparatus and/or method according to clause 1 and/or clause 2, wherein the at least one machine learning model is a sequence-to-sequence model.

Clause 8. The apparatus and/or method according to clause 1 and/or clause 2, wherein the at least one machine learning model is a recurrent network model.

Clause 9. The apparatus and/or method according to clause 1 and/or clause 2, further comprising at least one sensor, and wherein the first processor is configured to receive at least one sensor output from the at least one sensor that is inputted to the at least one machine learning model.

Clause 10. The apparatus according to claim 8, wherein the first processor is configured to determine that the error signal causes the malfunction of the at least one function of the target recipient device by applying the at least one sensor output to the at least one machine learning model.

Clause 11. The apparatus and/or method according to clause 1 and/or clause 2, wherein the first processor is configured to correct the error signal when the at least one machine learning model determines that a probability that the error signal causes the malfunction exceeds a predefined confidence level.

Clause 12. The apparatus and/or method according to clause 1 and/or clause 2, wherein the first processor is configured to ignore the error signal by passing the first output signal inputted to the at least one machine learning model to the second output signal that is transmitted to the target recipient device when the at least one machine learning model determines that a probability that the error signal causes the malfunction is below a predefined confidence level.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. An apparatus comprising:
   a first substrate;
   a first processor and a memory coupled to the first substrate;
      wherein the first processor is operationally connected to a signaling device comprising a second processor coupled to a second substrate;
      wherein the memory stores computer code having at least one machine learning model;
      wherein the first processor executes computer code stored in the memory that causes the first processor to:
         automatically receive from the second processor, a first output signal intended to be received by a target recipient device, wherein the first output signal comprises at least one instruction to the target recipient device, the at least one instruction being configured to cause the target recipient device to perform at least one action;
         automatically input the first output signal into the at least one machine learning model;
            wherein the at least one machine learning model is configured to perform at least:
               determine that the first output signal comprises an error signal that would cause a malfunction of at least one function performed by the target recipient device; and
               (ii) output an instruction that is configured to cause the first processor to generate a second output signal that is a corrected version of the first output signal;
         automatically generate the second output signal; and
         automatically instructing, via the second output signal instead of the first output signal, the target recipient device to perform the at least one action so as to facilitate error-corrected communication between the signaling device and the target recipient device.

2. The apparatus according to claim 1, wherein the first substrate and the second substrate are each a printed circuit board.

3. The apparatus according to claim 1, wherein the first substrate and the second substrate are the same substrate.

4. The apparatus according to claim 1, wherein the memory is a read only memory.

5. The apparatus according to claim 1, further comprising a microcontroller coupled to the first substrate; wherein the microcontroller comprises the first processor, and wherein the first processor is configured to receive updates to the at least one machine learning model through a communication circuitry in the microcontroller over a communication network.

6. The apparatus according to claim 1, wherein the at least one machine learning model is a sequence-to-sequence model.

7. The apparatus according to claim 1, wherein the at least one machine learning model is a recurrent network model.

8. The apparatus according to claim 1, further comprising at least one sensor, and wherein the first processor is configured to receive at least one sensor output from the at least one sensor that is inputted to the at least one machine learning model.

9. The apparatus according to claim 8, wherein the first processor is configured to determine that the error signal causes the malfunction of the at least one function of the target recipient device by applying the at least one sensor output to the at least one machine learning model.

10. The apparatus according to claim 1, wherein the first processor is configured to correct the error signal when the at least one machine learning model determines that a probability that the error signal causes the malfunction exceeds a predefined confidence level.

11. A method, comprising:
   automatically receiving, by a first processor coupled to a first substrate and operationally connected to a signaling device comprising a second processor coupled to a second substrate, a first output signal intended to be received by a target recipient device wherein the first output signal comprises at least one instruction to the target recipient device, the at least one instruction being configured to cause the target recipient device to perform at least one action;
   automatically inputting, by the first processor, the first output signal into at least one machine learning model;
      wherein the at least one machine learning model is configured to perform at least:
         determining that the first output signal comprises an error signal that would cause a malfunction of at least one function performed by the target recipient device; and
         (ii) output an instruction that is configured to cause the first processor to generate a second output signal that is a corrected version of the first output signal;
   automatically generating, by the first processor, the second output signal; and
   automatically instructing, by the first processor, via the second output signal instead of the first output signal, the target recipient device to perform the at least one action so as to facilitate error-corrected communication between the signaling device and the target recipient device.

12. The method according to claim 11, wherein the at least one machine learning model is a sequence-to-sequence model.

13. The method according to claim 11, wherein the at least one machine learning model is a recurrent network model.

14. The method according to claim 11, further comprising receiving, by the first processor, updates to the at least one machine learning model through a microcontroller over a communication network; wherein the microcontroller comprises the first processor and a communication circuitry operationally coupled to the communication network.

15. The method according to claim 11, further comprising receiving, by the first processor, at least one sensor output from at least one sensor that is inputted to the at least one machine learning model.

16. The method according to claim 15, wherein determining that the error signal causes the malfunction of the at least one function of the target recipient device comprises applying the at least one sensor output to the at least one machine learning model.

17. The method according to claim 11, wherein correcting the error signal in the first output signal comprises correcting the error signal from the first output signal when the at least one machine learning model determines that a probability that the error signal causes the malfunction exceeds a predefined confidence level.

18. The method according to claim 11, further comprising sending, by the first processor, over a communication network to a third-party server, a dataset comprising a plurality of error signals from the first output signal over a predefined time interval that causes the malfunction of the at least one function of the target recipient device for retraining the at least one machine learning model.

* * * * *